United States Patent [19]

Hamilton et al.

[11] Patent Number: 4,764,687
[45] Date of Patent: Aug. 16, 1988

[54] VARIABLE TIMING SEQUENCER

[75] Inventors: Stephen W. Hamilton, Los Gatos; Philip C. Wong, San Mateo, both of Calif.

[73] Assignee: Data General Corporation, Westboro, Mass.

[21] Appl. No.: 68,255

[22] Filed: Jun. 30, 1987

[51] Int. Cl.⁴ .................. H03K 5/13; H03K 17/00; G06M 3/00
[52] U.S. Cl. ................................ 307/269; 307/480; 328/63; 328/72; 328/75; 364/569; 377/26; 377/39
[58] Field of Search ............... 307/480, 269, 265, 271; 328/63, 72, 75, 58; 364/569; 377/26, 39

[56] References Cited

U.S. PATENT DOCUMENTS

| | | | |
|---|---|---|---|
| 3,808,544 | 4/1974 | Walker | 328/75 |
| 4,523,289 | 6/1985 | Soma et al. | 364/569 |
| 4,604,717 | 8/1986 | Kaplan | 364/569 |
| 4,675,546 | 6/1987 | Shaw | 307/265 |

Primary Examiner—Stanley D. Miller
Assistant Examiner—Trong Quang Phan
Attorney, Agent, or Firm—Limbach, Limbach & Sutton

[57] ABSTRACT

A variable timing sequencer for producing sets of data which correspond to different current states of the sequencer, wherein the interval of each such set of data corresponds to said current state and user input, and said current state is determined by a previous state and input data. This separation of the time domain sequencing from the functional sequencing allows operation of functional components at lower frequencies than the timing components and the increase of effective memory density. The ability to affect both current state and interval by means of an input permits the sequencer to be used in a variety of conditions and applications with a minimum amount of reprogramming.

29 Claims, 10 Drawing Sheets

VARIABLE TIMING SEQUENCER

DESCRIPTION

1. Technical Field

The present invention relates to signal generation equipment of the type known as automatic sequencers. In many types of equipment it is useful to be able to produce output "words," each of which is a string of digital bits, in a given order, or time sequence.

2. Background Art

While a sequence of output words may be completely preset, it is often more useful to have the order of output words determined by both preset data and signals input by the user. In addition, in present equipment, the output words are generally each produced for a uniform period of time, equal to the unit cycle time of a clock which tells the device when to go to the next "state," i.e. output signal, or some integral multiple of that unit cycle time.

In some applications, however, it is useful to be able to vary the duration of the output words as well as the pattern and produce outputs of a controlled width with incremental variations less than the unit cycle time, such as 1¼ cycles or 1½ cycles, etc.

One possible way to do this is to use a clock with a high enough frequency such that any desired length of signal is an integral multiple of smaller-unit cycles, and include a counter to count the cycles. In the above example, the clock would need to run at a frequency four times higher in order to generate signals in ¼ cycle increments of the original clock unit cycle.

This has two disadvantages. The first is that in some technologies it is difficult to build a clock that operates at a high enough frequency to generate the smallest desired increment. The second, and more limiting one, is that in existing circuits the entire sequencer must operate at the higher frequency. In fact, given the inherent delay times of the components, this may be impossible at frequencies sufficiently high to meet the user's requirements.

SUMMARY OF THE INVENTION

It is desired to overcome these disadvantages by means of a device for generating outputs of controlled width in increments less than a unit cycle, thus avoiding the problems inherent in the use of a higher frequency clock. In addition, it is desired to allow for the greatest flexibility in potential uses for the device with a minimum amount of reprogramming of memory devices.

To this end, the invention is directed to a sequencer that separates the time domain sequencing from the functional sequencing and handles them separately so that the functional components may operate at lower frequencies than the timing components and need not be able to respond to signals having the smallest desired increment in signal duration. Also, the effective memory density is increased when similar functional sequences have multiple timing sequences.

Specifically, what is disclosed is a variable timing sequencer for producing sets of data which correspond to different current states of the sequencer, wherein the interval of each such set of data corresponds to said current state and user input, and said current state is determined by a previous state and input data, comprising first programmable memory means responsive to the input data and a current state signal representative of the current state for providing a new state signal representative of a predetermined new state; memory latch means for receiving the new state signal, for holding the current state signal and for supplying said current state signal as an output and for replacing the current state signal with the new state signal upon receipt of a clock timing signal; means for supplying the current state signal to the input of the first programmable memory means; second programmable memory means for receiving the current state signal from said memory latch means and for producing as an output a specified set of data corresponding to the current state; and clock means responsive to the current state signal for generating the clock timing signal after a delay having a length determined by the current state signal, so that the first and second programmable memory means can operate at lower frequencies than the clock means.

The invention will be better understood and other characteristics will appear from the description upon consideration of the accompanying drawings. The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE ILLUSTRATED EMBODIMENT

FIGS. 3 and 5 through 8 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
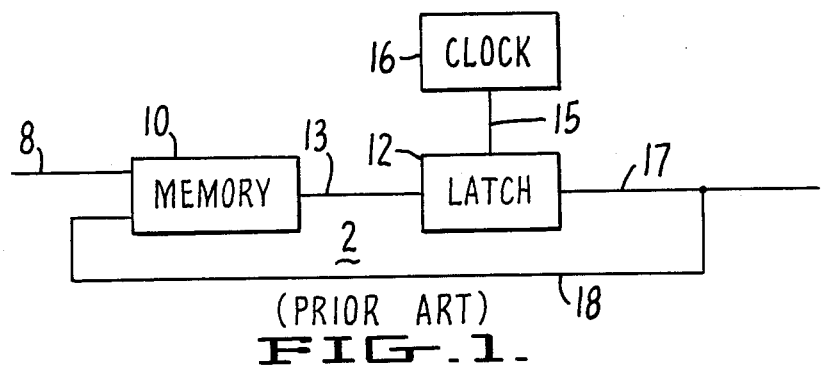
FIG. 1 is a block diagram of a sequencer of the prior art allowing for the sequence to be dictated by input data as well as preset sequences.

FIG. 1 shows a sequencer 2 of the prior art. The sequencer 2 comprises a programmable memory device 10, a latch 12, and a feedback loop 18. The programmable memory device 10 holds various sets of data. The memory device 10 receives as an input data 8 and, by means of the feedback loop 18, also receives as input the current set of output data 17. Based upon the logic programmed therein, the memory device 10 responds to these inputs and generates a new set of output data 13, which is sent to the latch 12. Upon the receipt of a clock timing signal 15 from a clock 16 which sets the latch 12, the new set of output data 13 replaces the data stored in the latch 12 and becomes the current set of data 17. The current set of data 17 forms the output of the sequencer 2. The memory device 10 receives the output data 17 from the feedback loop 18 and generates another set of memory output data 13 which is similarly received by the latch 12 until receipt of the next clock signal 15. The sequencer 2 can operate indefinitely, given power and programming that covers all possible inputs received for each possible output.

However, the sequencer 2 of FIG. 1 generates a new output 17 on each clock timing signal, which is generally a unit cycle of the clock or some fixed multiple thereof, resulting in output signals of fixed duration. In addition, the memory 10 and the latch 12 must be large enough to hold all of the output data 14 desired for all possible inputs 8, and as the components grow larger they, and thus the system, respond more slowly.

Figure 2:
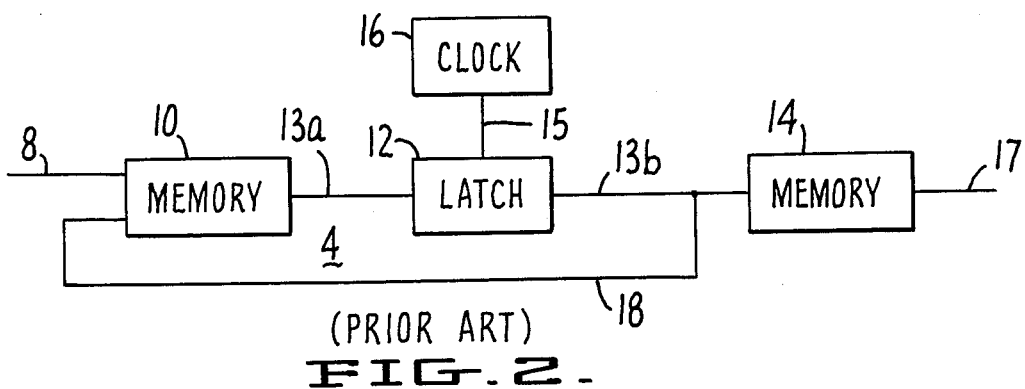
FIG. 2 is a block diagram of another sequencer of the prior art wherein the desired output data has been moved to a second memory outside of the sequencing loop.

FIG. 2 demonstrates another sequencer 2 of the prior art which offers an improvement to the sequencer 2 shown in FIG. 1. A second memory 14 receives the output 13b of the latch 12. The output 13b of the latch 12 is also an input to first memory 10 via loop 18. The memory 10 and latch 12 function essentially as before, except that the memory output data 13a of memory 10 is not the actual output data 17 desired but simply a binary number that represents a particular state of the sequencer 2. Thus, memory 10 can be substantially smaller and faster than in the sequencer 2 in FIG. 1. The state number 13a replaces the previous one in the latch 12 upon receipt of a clock timing signal 15 from a clock 16, as before. When this happens, the output 13b of the latch 12 is fed back as an input to memory 10 via loop 18 and is also received by the second memory 14, which generates the preprogrammed set of output data 17 corresponding to that state number 13b.

This type of split memory sequencer is known as a horizontal-vertical sequencer or a data compaction sequencer. Memory 10 is the "vertical" portion and second memory 14 is the "horizontal" position of the device. (In practice, this pure form of memory separation is often violated. It is common to have the output of the second memory 14 directly depend in part upon the input data 8.)

To demonstrate this principle, the following table demonstrates the inputs, state encodings and output of memory 10.

| State Table for Memory 10 | | | | |
|---|---|---|---|---|
| Current State Encoding | State | Inputs | Next State | State Encoding |
| 0 x 0 0 0 | 0,27 | x x x x x x 0 1 | 22 | 0 1 0 1 0 |
| 0 x 0 0 0 | 0,27 | x x x x x x 1 1 | 27 | 0 0 0 0 0 |
| 1 0 0 1 0 | 1 | x x x x 1 x x x x | 1 | 1 0 0 1 0 |
| 1 0 0 1 0 | 1 | x x x x 0 x x x x | 2 | 0 0 1 0 0 |
| 0 0 1 0 0 | 2 | x x x x x x x x x | 3 | 0 1 1 0 0 |
| 0 1 1 0 0 | 3 | x x x x x x x x x | 4 | 1 0 1 1 0 |
| 1 0 1 1 0 | 4 | 0 x x x x x x x x | 6 | 0 0 0 0 1 |
| 1 0 1 1 0 | 4 | 1 x x x x x x x x | 5 | 0 0 0 1 1 |
| 0 0 0 1 1 | 5 | x x x x 1 x x x | 5 | 0 0 0 1 1 |
| 0 0 0 1 1 | 5 | x x x x 0 x x x | 7 | 0 0 1 1 1 |
| 0 0 0 0 1 | 6 | x x x x 1 x x x | 6 | 0 0 0 0 1 |
| 0 0 0 0 1 | 6 | x x x x 0 x x x | 8 | 0 0 1 0 1 |
| 0 0 1 1 x | 7,25 | x x x x x x 1 1 | 0 | 0 0 0 0 0 |
| 0 0 1 1 x | 7,25 | x x x x x x 0 1 | 1 | 1 0 0 1 0 |
| 0 0 1 1 x | 7,25 | x x x x x x 0 1 | 24 | 1 1 1 1 0 |
| 0 x 1 0 1 | 8,13 | x x x x x x 1 1 | 0 | 0 0 0 0 0 |
| 0 x 1 0 1 | 8,13 | x x x x x x 0 1 | 1 | 1 0 0 1 0 |

*-continued*

| State Table for Memory 10 | | | | |
|---|---|---|---|---|
| Current State Encoding | State | Inputs | Next State | State Encoding |
| 0 x 1 0 1 | 8,13 | 0 0 x x x x 0 1 | 26 | 1 1 0 1 0 |
| 1 1 1 0 0 | 9 | x x x x x x 0 x x | 9 | 1 1 1 0 0 |
| 1 1 1 0 0 | 9 | x x x x x x 1 x x | 10 | 1 0 1 0 0 |
| 1 0 1 0 0 | 10 | x x x x x x x x x | 11 | 1 1 0 0 1 |
| 1 1 0 0 1 | 11 | 1 x x 1 x x x x x | 12 | 1 1 0 1 1 |
| 1 1 0 0 1 | 11 | 0 x x 1 x x x x x | 14 | 1 0 0 1 1 |
| 1 1 0 0 1 | 11 | x x x 0 x x x x x | 17 | 1 0 0 0 1 |
| 1 1 0 1 1 | 12 | x x x x x x x x x | 13 | 0 1 1 0 1 |
| 1 0 0 1 1 | 14 | x x x x x x x x x | 12 | 1 1 0 1 1 |
| 0 1 1 1 1 | 16 | x x x x x x 1 1 | 0 | 0 0 0 0 0 |
| 0 1 1 1 1 | 16 | x 1 x x x x 0 1 | 1 | 1 0 0 1 0 |
| 0 1 1 1 1 | 16 | x 0 x x x x 0 1 | 26 | 1 1 0 1 0 |
| 1 0 0 0 x | 17,18 | x x x x x x x x | 19 | 1 1 0 0 0 |
| 1 1 0 0 0 | 19 | x x x x x x x x x | 20 | 0 1 0 1 1 |
| 0 1 0 1 1 | 20 | x x x x x x x x x | 23 | 0 0 0 1 0 |
| 0 1 1 1 0 | 21 | x x x x x x x 0 x | 25 | 0 0 1 1 0 |
| 0 1 0 1 0 | 22 | x x x x x x x x x | 26 | 1 1 0 1 0 |
| 0 0 0 1 0 | 23 | x x x x x x x x x | 17 | 1 0 0 0 1 |
| 1 1 1 1 0 | 24 | x x x x x x 0 x | 16 | 0 1 1 1 1 |
| 1 1 0 1 0 | 26 | x x x x x x 0 x | 21 | 0 1 1 1 0 |

An "x" is a "don't care," i.e., it does not matter whether the bit is a 1 or a 0. Note that the decimal state numbers are given only for ease of reference and are not decimal equivalents of the binary codings.

Similarly, the following table shows the outputs produced by memory 14 for each state. As mentioned previously, the output depends not only on the state but on two input bits from input 8 as well.

| State Table for Memory 14 | | | |
|---|---|---|---|
| State | State Encoding | Inputs | Outputs |
| 0,27 | 0 x 0 0 0 | x x | 0 0 0 0 0 0 0 0 0 0 0 1 0 0 0 |
| 1 | 1 0 0 1 0 | x x | 0 0 0 1 0 0 0 1 0 0 1 0 0 1 0 0 |
| 2 | 0 0 1 0 0 | x x | 1 1 0 1 0 0 0 1 0 0 1 0 0 0 0 0 |
| 3 | 0 1 1 0 0 | x x | 0 0 0 0 0 0 0 0 0 1 0 1 0 0 1 0 |
| 4 | 1 0 1 1 0 | x x | 0 0 0 1 0 0 0 1 0 1 0 1 0 0 0 0 |
| 5 | 0 0 0 1 1 | x x | 0 0 0 1 0 1 0 1 0 1 0 1 0 0 0 0 |
| 6 | 0 0 0 0 1 | x x | 0 0 0 1 0 1 1 1 0 1 0 1 0 0 0 0 |
| 7,8, 13,16 | 0 x 1 x 1 | 0 1 | 0 0 0 0 0 0 0 0 0 0 0 1 0 0 0 0 0 |
| 7,8 | 0 0 1 x 1 | x x | 0 0 0 0 1 0 0 1 0 0 0 0 0 0 0 0 |
| 8 | 0 0 1 0 1 | 0 0 | 0 0 0 0 1 0 0 1 0 0 0 0 1 0 0 0 0 |
| 9,10 | 1 x 1 0 0 | x x | 0 0 1 0 0 0 0 0 0 0 1 0 0 0 0 |
| 11 | 1 1 0 0 1 | x x | 0 0 1 0 0 0 0 0 1 0 0 1 0 0 0 0 |
| 12 | 1 1 0 1 1 | x x | 0 0 1 0 0 1 1 0 0 0 0 0 0 0 0 0 |
| 13,16 | 0 1 1 x 1 | 0 0 | 0 0 0 0 0 0 0 0 0 0 0 1 0 0 0 0 |
| 14,17 | 1 0 0 x 1 | x x | 0 0 1 0 0 0 0 0 0 0 0 0 0 0 0 0 |
| 19 | 1 1 0 0 0 | x x | 0 0 0 0 0 0 0 0 1 0 0 0 0 0 0 |
| 20 | 0 1 0 1 1 | x x | 0 1 0 0 0 0 0 1 0 1 0 0 0 0 0 0 |
| 21 | 0 1 1 1 0 | x x | 0 0 0 0 1 0 0 0 0 0 0 1 0 0 0 0 |
| 22,26 | x 1 0 1 0 | x x | 0 0 0 0 0 0 0 0 0 0 1 0 0 0 0 |
| 23 | 0 0 0 1 0 | x x | 0 1 0 1 0 0 0 1 0 1 0 0 0 0 0 1 |
| 24 | 1 1 1 1 0 | x x | 0 0 0 0 0 0 1 0 0 0 0 0 0 0 0 0 |
| 25 | 0 0 1 1 0 | 0 1 | 0 0 0 0 0 0 0 0 0 0 1 0 0 0 0 0 |

Figure 3:
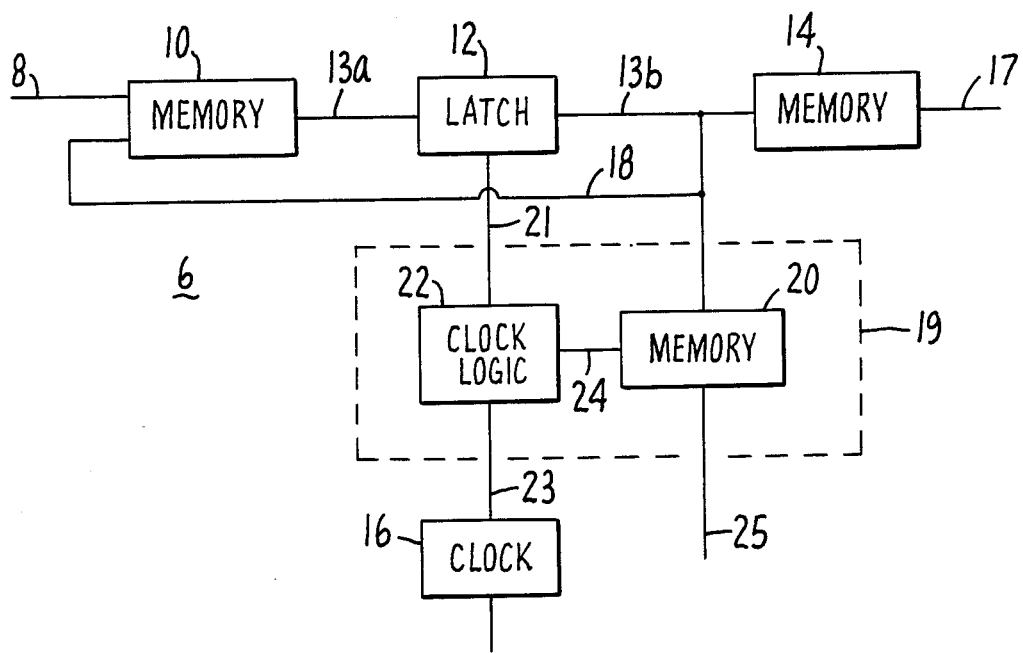
FIG. 3 is a block diagram of the sequencer of the present invention.

Referring to FIG. 3, there is shown a block diagram of a sequencer 6 of the present invention. The sequencer 6 comprises a first memory 10, a latch 12, a second memory 14, a feedback loop 18 and a clock controller 19.

The first memory 10 receives the input data 8 and the data from the feedback loop 18 and generates a first memory output 13a therefrom. The first memory output 13a is supplied to a latch 12 which also receives a timing signal 21 from the clock controller 19. In response to the clock timing signal 21, the latch 12 replaces the prior state output 13b with the new state output 13a, which is supplied to the second memory 14 and is also supplied to the feedback loop 18.

The second memory 14 generates the output 17 of the sequencer 6 in response to the state output 13b (and two bits of input data 8, as mentioned previously).

The clock controller 19 receives the clock signals 23 from a clock 16 and in response thereto generates the timing signal 21 which is supplied to the latch 12.

Figure 4:
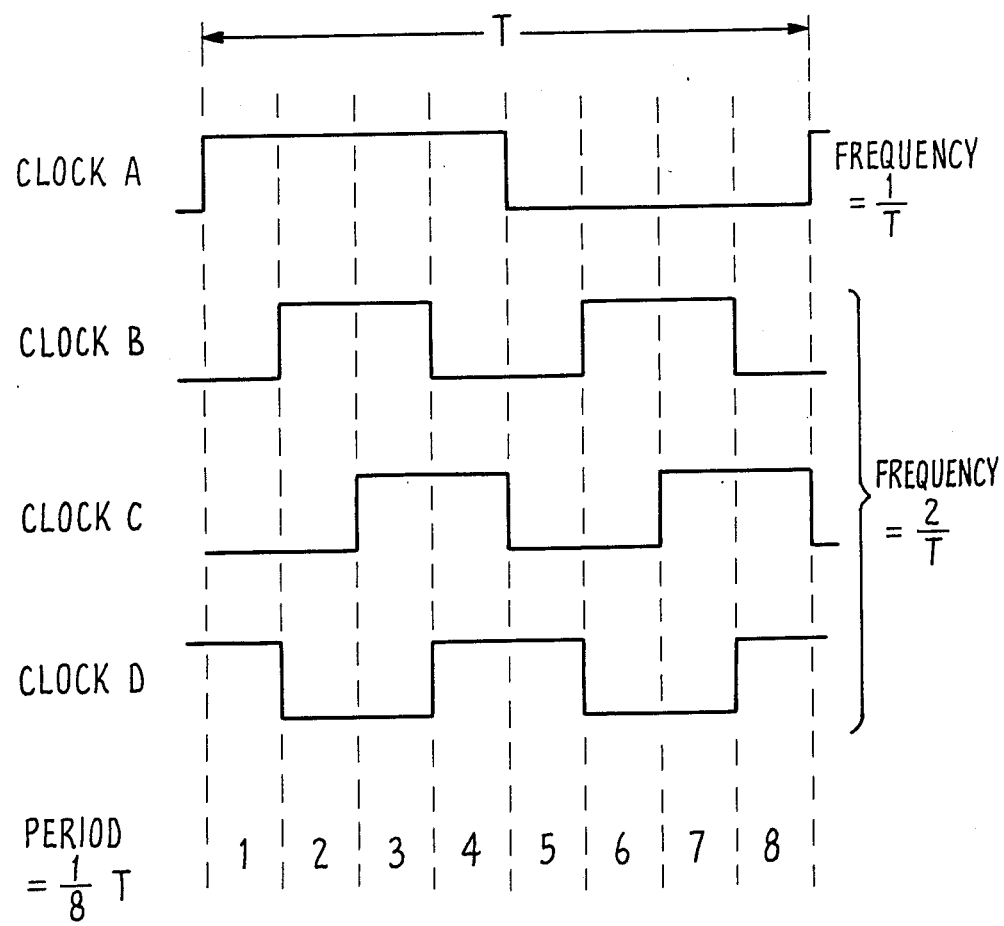
FIG. 4 is a diagram of the signals generated by the clocks in the preferred embodiment of the present invention.

In the prepared embodiment, the clock 16, in addition, is comprised of four clock signals. One clock signal A has a unit cycle of time T and thus a frequency of 1/T. The other three clock signals, B, C and D, have unit cycles of time $\frac{1}{2}$T, and thus frequency of 2/T, and are staggered with respect to the first clock signal A. Each of the clock signals B, C and D has an initial rising signal edge which is progressively later in $\frac{1}{8}$T increments from the leading edge of clock signals A, B, and C respectively. Thus, as shown in FIG. 4, 8 minor periods of $\frac{1}{8}$T are defined even though no clock has a unit cycle smaller than $\frac{1}{2}$T.

The clock controller 19 includes of two elements. A timing memory 20 is preprogrammed to determine for each state of the sequencer 6 how long the state is to be maintained. Upon receiving the state encoding from the latch 12, the timing memory 20 generates a signal 24 corresponding to that state that indicates the number of minor clock periods each of duration $\frac{1}{8}$T that are to pass before a clock timing signal 21 is to be sent to set the latch 12 and allow the next state 13a generated by memory 10 to replace the current state 13b.

The clock logic 22 marks the transition to the current state and counts the number of minor clock periods that pass and sends the clock timing signal when the number of minor clock periods received from timing memory 20 has passed. To do this, the clock logic 22 keeps track of where in the major cycle the clock is, since n minor clock periods from one point requires different clock edges to pass than the same number of minor clock periods from some other point in the cycle. In the preferred embodiment, the minimum number of minor clock periods between clock timing signals to the latch is 2; otherwise the signals may overlap. Thus, the duration of any state may be $\frac{1}{4}$T or greater.

Figure 5:
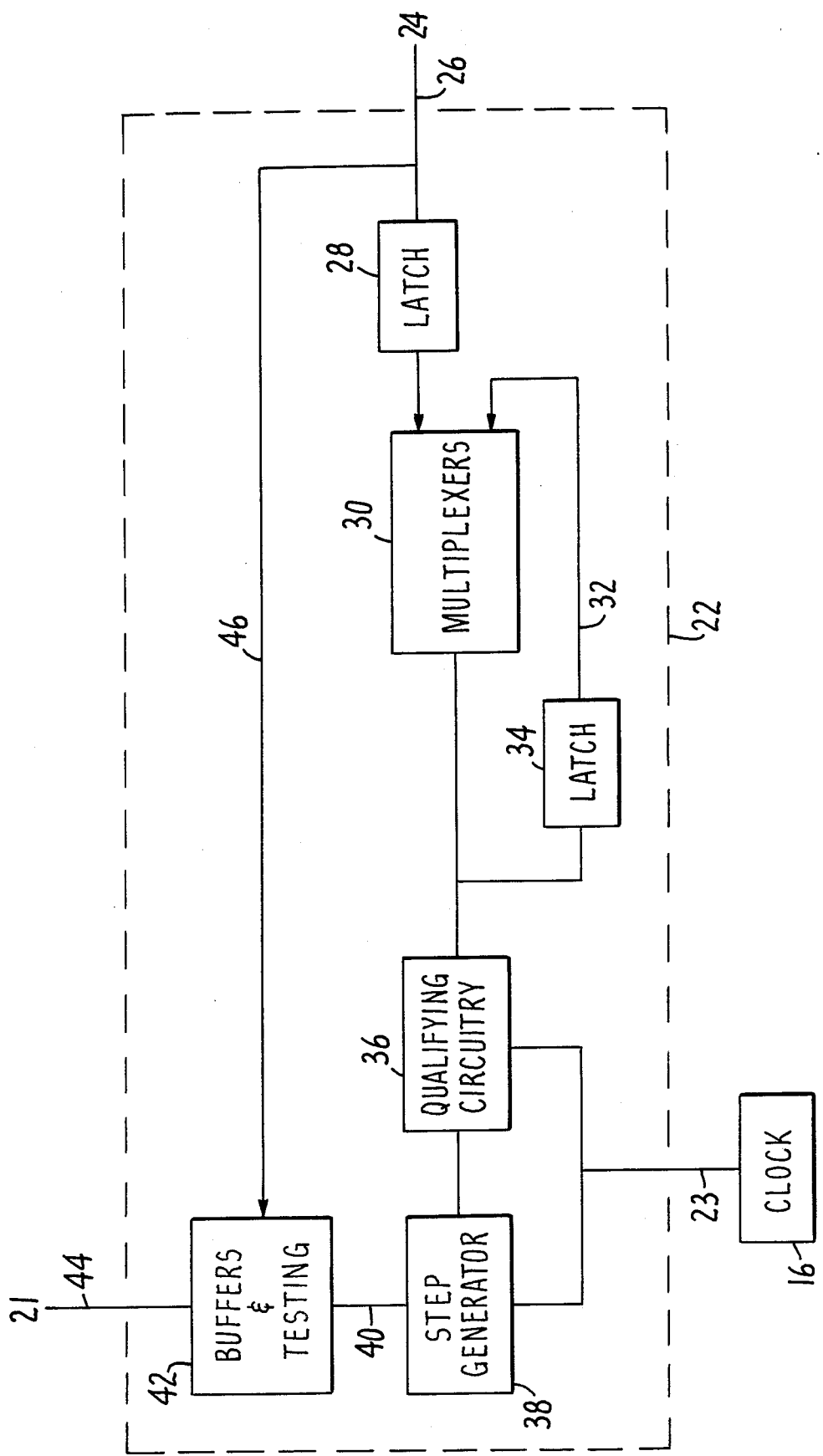
FIG. 5 is a block diagram of the clock controller of the present invention.

FIG. 5 is a block diagram of the clock logic 22. The signal 24 from the timing memory 20 is received by the clock logic 22 at input 26 on FIG. 5. In the preferred embodiment, an 8 bit signal is used for signal 24, with the active bit indicating the number of minor clock periods desired from 1 to 8. (The timing memory 20 generates one more bit, a "long interval" bit, which indicates whether the signal 24 is the correct number of periods or whether the true number is 9 to 16. The use of this extra bit is explained below.) The signal 24 representing the number of minor clock periods of the current state is held in latch 28 for internal synchronization and is then fed from latch 28 to a set of multiplexers 30. The multiplexers 30 also receive a feedback signal 32, which indicates the current position of the clocks, i.e., which minor clock period the clock is in currently. From these signals the multiplexers 30 determine the "target clock position," which corresponds to the desired time for generation of the next clock timing signal 21, by performing modulo 8 addition of the signals. The output is fed to latch 34 which again provides internal synchronization, and an enable signal is generated for the target clock position. The target clock position is also fed back as signal 32 to become the current position for the next cycle.

The enable signal is fed to circuit 36, which determines the clock position one minor clock period before the target clock position and generates a signal which "qualifies" the enable signal and permits a clock timing signal to be generated only after both the proper clock positions are reached. This prevents a clock timing signal 21 from being generated by a leading signal edge of any of the four clocks other than the appropriate one.

The "qualified" enable signal is received by step generator 38, which also receives the clock signals as input, and a step signal is generated at 40.

The remaining circuitry 42 includes buffering and testing circuitry and circuitry that allows the first step signal to be suppressed if the number of minor clock periods desired is more than 8, i.e., more than one major clock cycle, so that the desired duration may be achieved. The "long interval" bit is received from timing memory 20, as mentioned above, on line 46 and is used to activate the suppressing circuitry if the number of periods desired is greater than 8. The clock timing signal 21 is then generated at output 44 and sent to latch 12 as described previously.

Figure 6A:
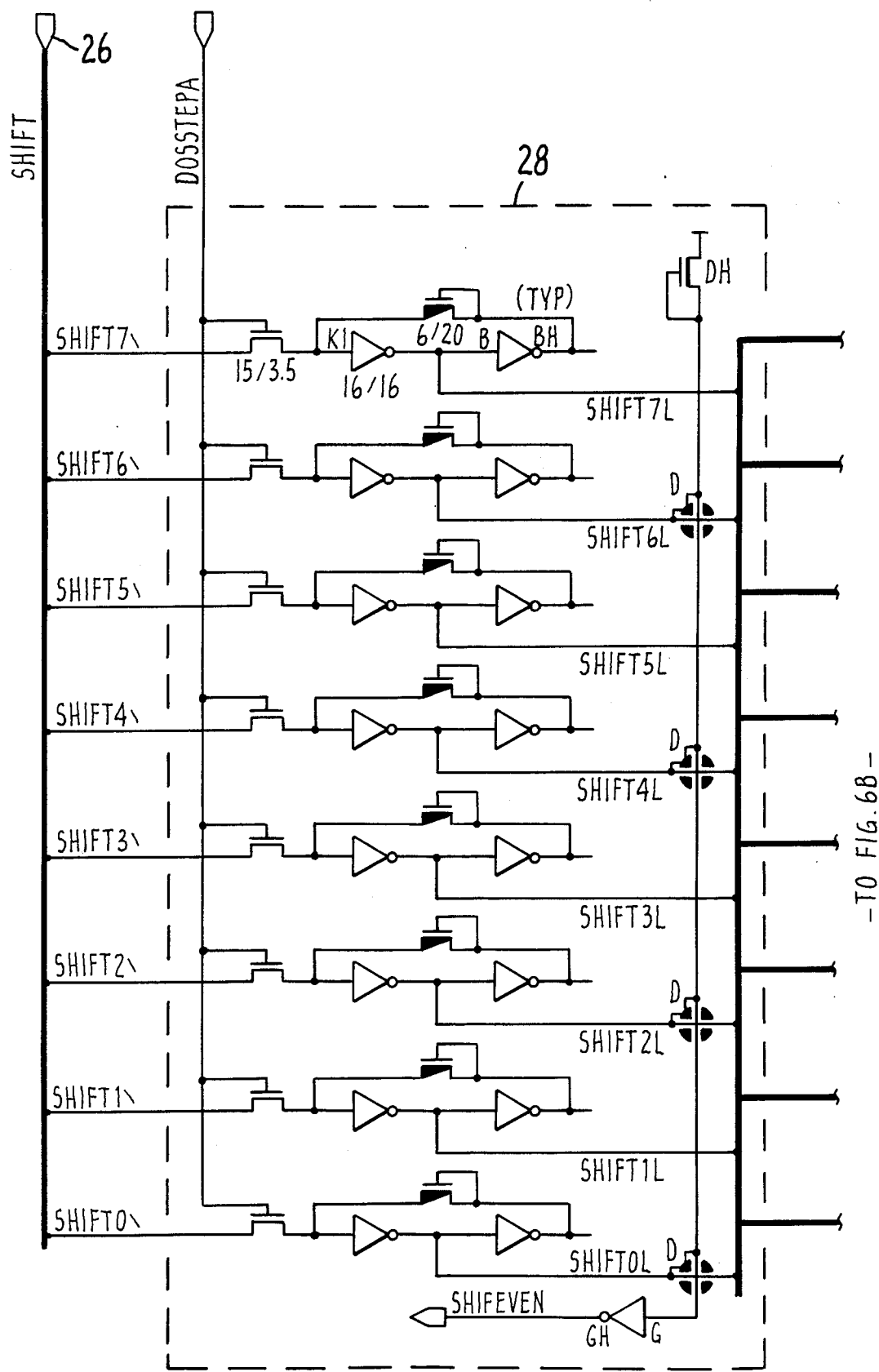
FIGS. 6 through 8 are schematic diagrams of the clock controller of the present invention.
Figure 6B:
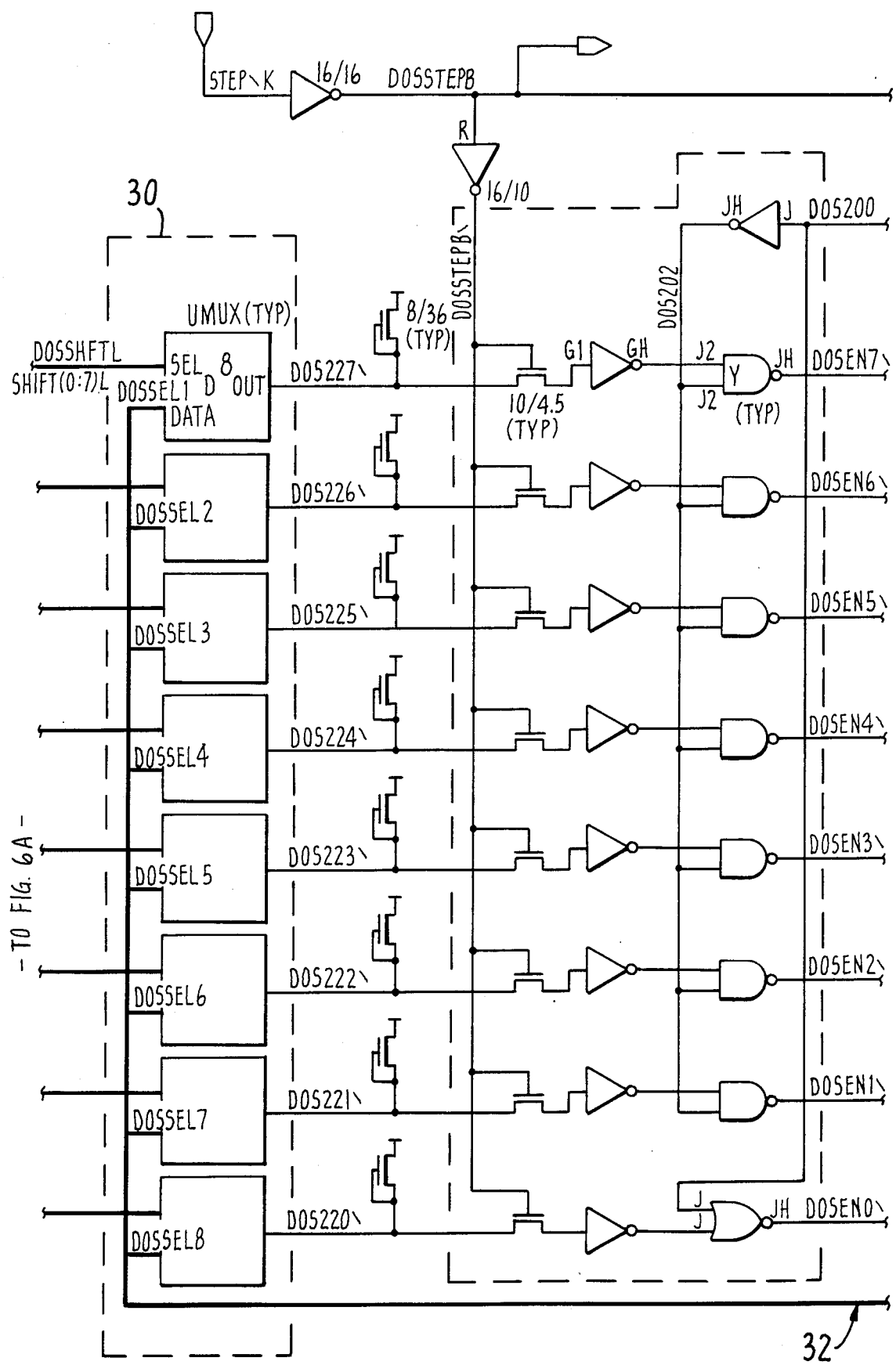
Figure 6C:
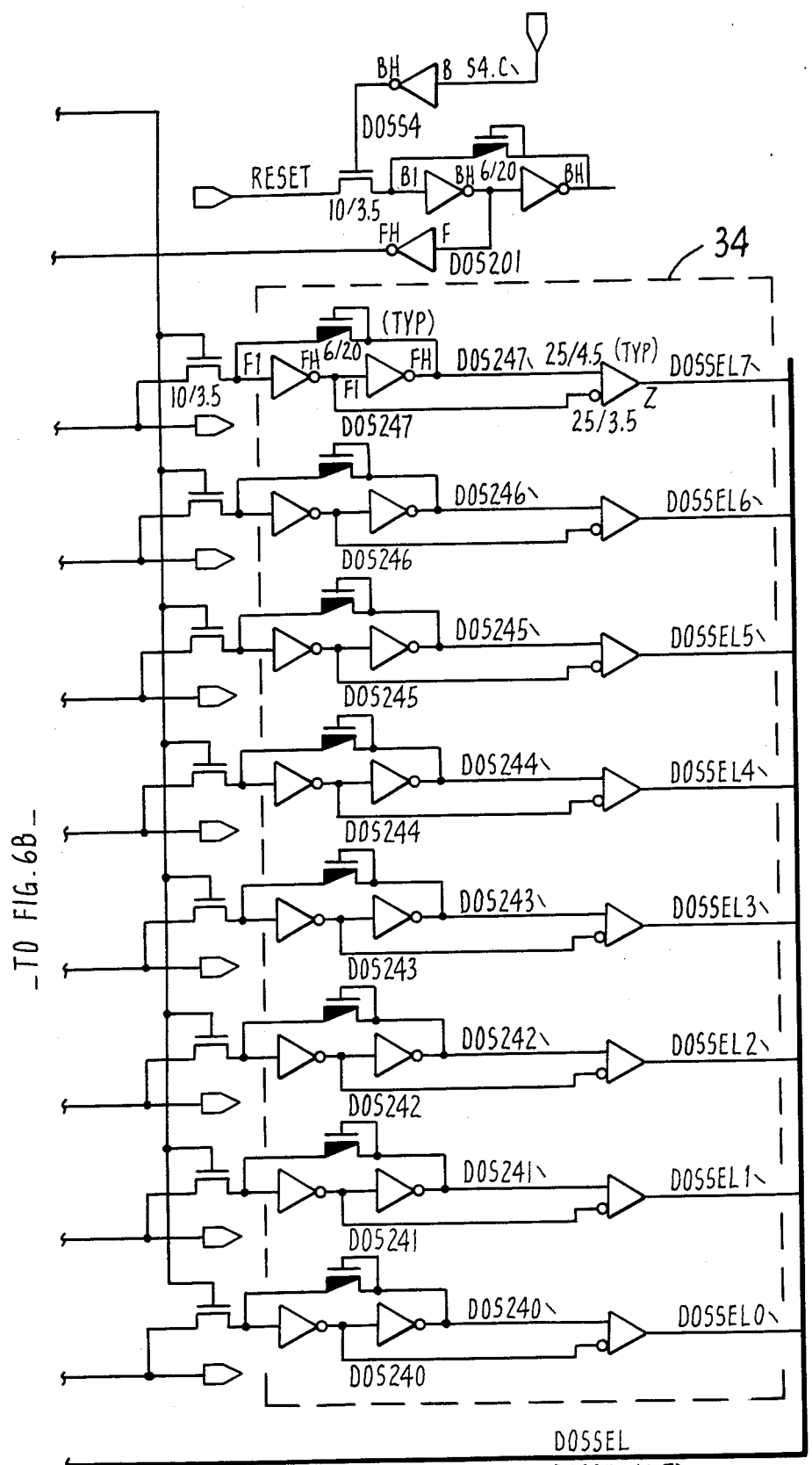
Figure 7A:
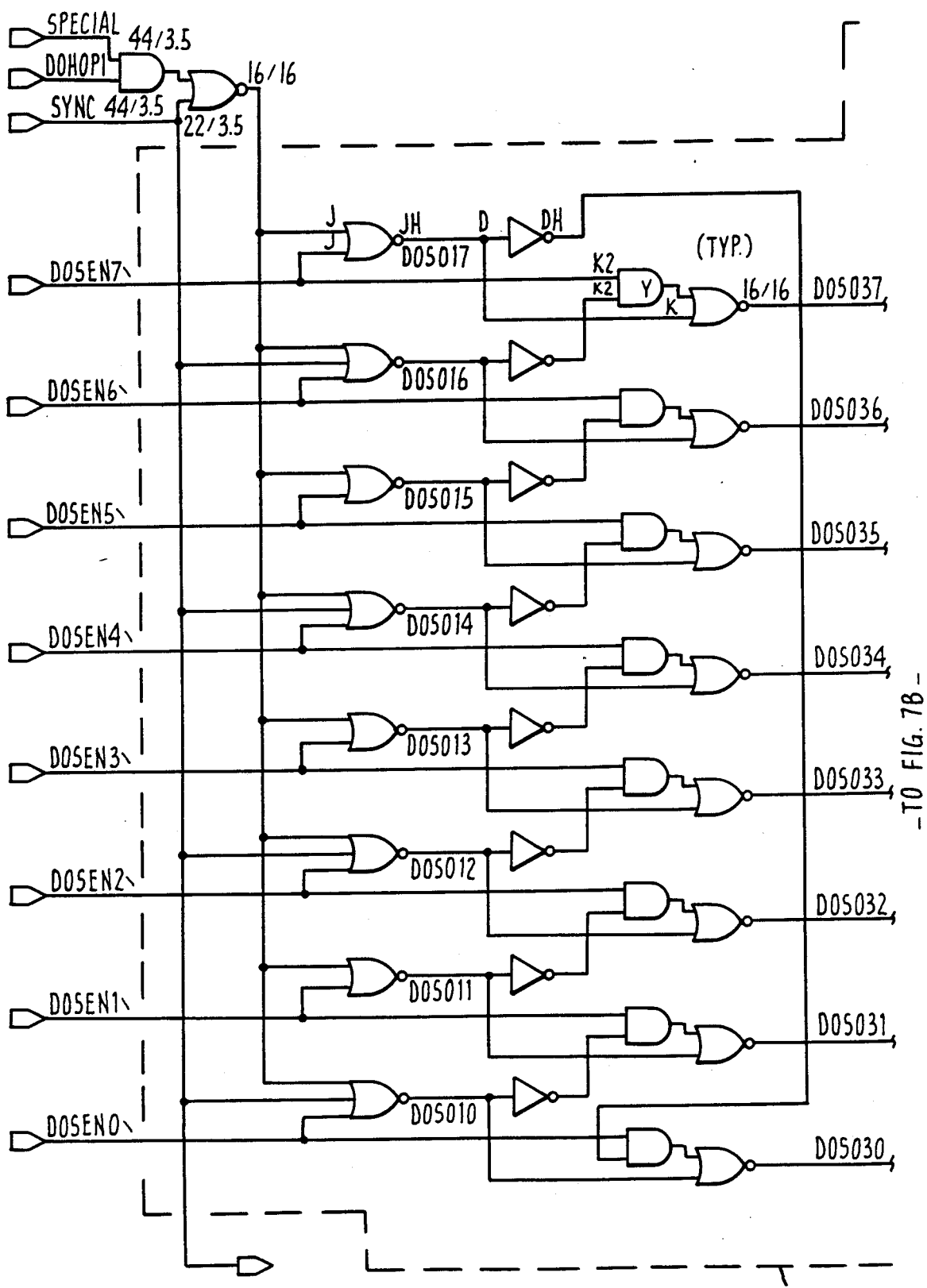
Figure 7B:
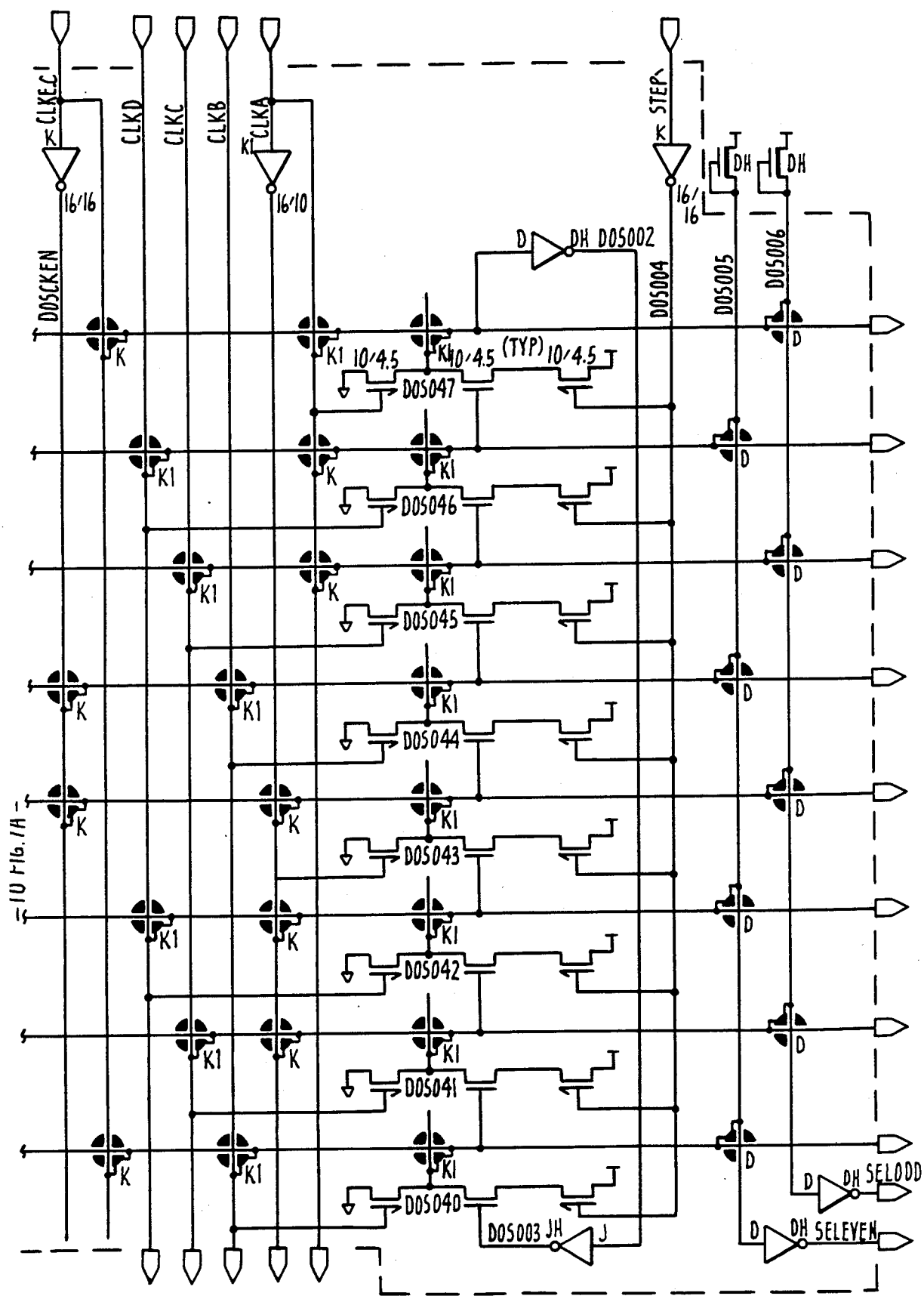
Figure 8A:
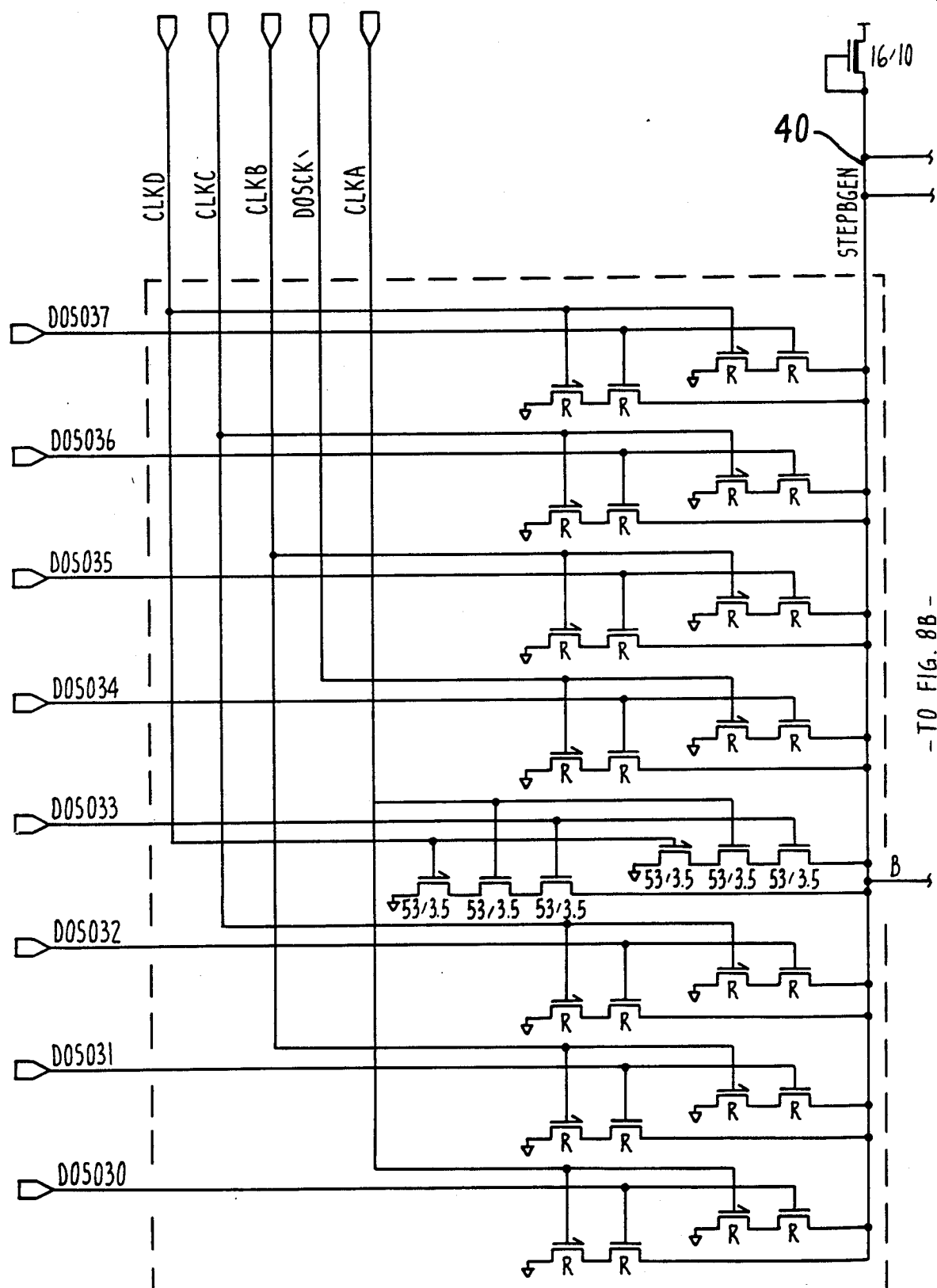
Figure 8B:
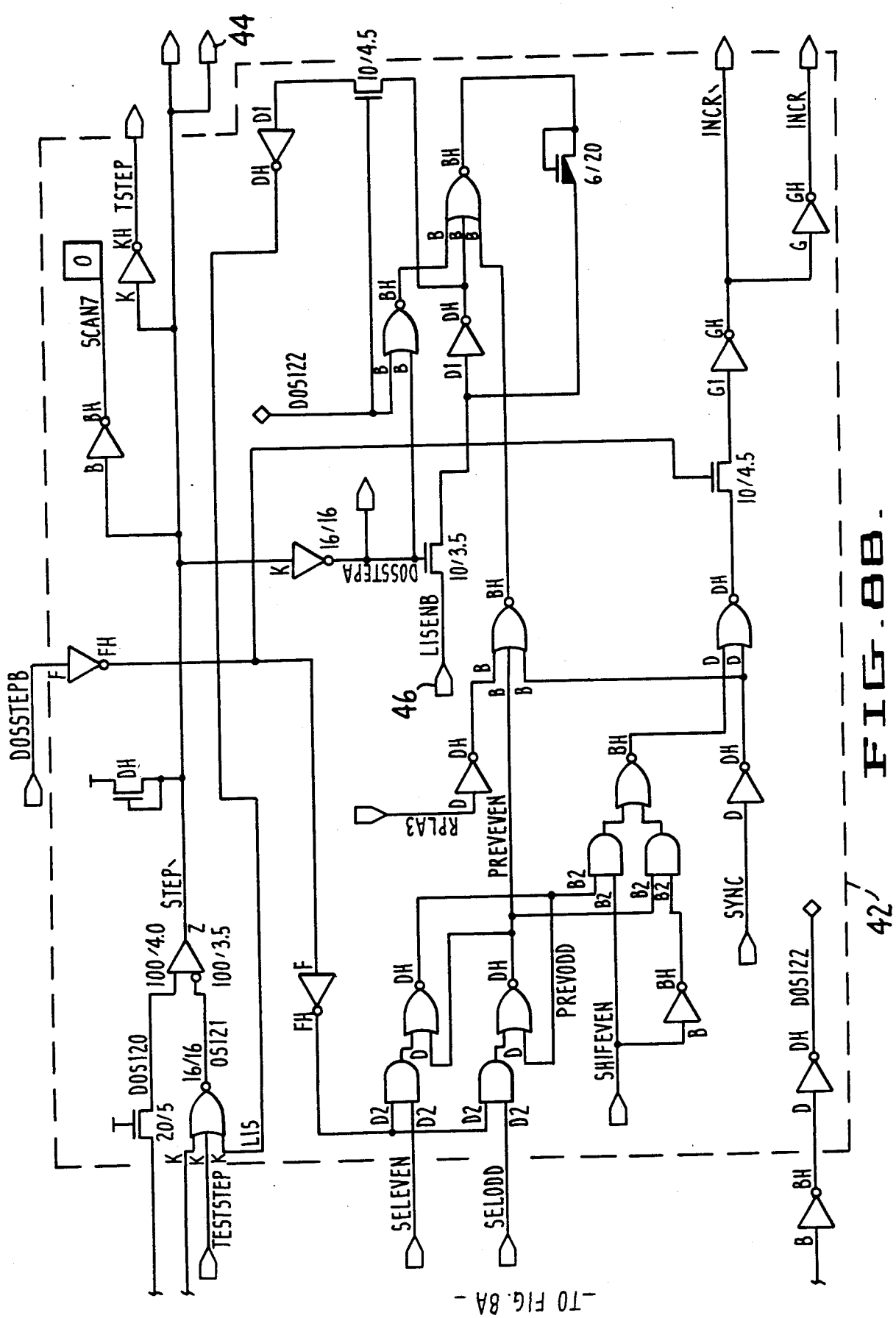

FIGS. 6, 7 and 8 show a schematic diagram of the clock logic 22. The numbers thereon correspond to the description of the block diagram presented above.

The modulo 8 addition to determine the target clock position from the current clock position feedback signal 32 and the signal 24 representing the number of minor clock periods for which the current state is desired is performed by eight multiplexers 30. Each multiplexer receives the eight bit signal 24, where one active bit indicates the number of periods desired, from 1 to 8, and an eight bit feedback signal 32, where one active bit indicates the current clock position. One of these signals is shifted around so that each multiplexer receives the signal shifted 1 bit from the next multiplexer; in the particular embodiment used here, the signal 24 representing the number of periods for the current state is so shifted. The multiplexers 30 perform a one to one matching between feedback signal 32 and the set of shifted signals generated from signal 24. Each multiplexer selects one bit of the signal 24 to pass through, and due to the shifting of signal 24 only the line reflecting the target clock position comes out differently from the others.

Another possible embodiment of this would shift the feedback signal 32 by one bit to each succeeding multiplexer. For example, suppose a delay of four minor clock periods is desired and the clock is currently in minor period two. The signal 24 for the number of minor clock periods might be 00001000, where the bit 1 is in the position representing four periods (the first bit is for zero, or eight, minor clock periods). This signal forms the top axis of the chart below. The feedback signal, representing clock position two, is 00000100; this is the signal shown in the first line as the input to M1, the first multiplexer. (Note that on FIG. 6, the outputs of latch 34 to feedback signal 32 show the clock position in descending order.)

| Delay | | | | | | | | |
|---|---|---|---|---|---|---|---|---|
| 0 | 1 | 2 | 3 | 4 | 5 | 6 | 7 | Number of periods |
| 0 | 0 | 0 | 0 | 1 | 0 | 0 | 0 | Binary signal |
| M1 0 | 0 | 0 | 0 | 0 | 1 | 0 | 0 | |
| M2 0 | 0 | 0 | 0 | 1 | 0 | 0 | 0 | |
| M3 0 | 0 | 0 | 1 | 0 | 0 | 0 | 0 | |
| M4 0 | 0 | 1 | 0 | 0 | 0 | 0 | 0 | |
| M5 0 | 1 | 0 | 0 | 0 | 0 | 0 | 0 | |

-continued

| Delay 0 0 | 1 0 | 2 0 | 3 0 | 4 1 | 5 0 | 6 0 | 7 0 | Number of periods Binary signal |
|---|---|---|---|---|---|---|---|---|
| M6 1 | 0 | 0 | 0 | 0 | 0 | 0 | 0 | |
| M7 0 | 0 | 0 | 0 | 0 | 0 | 0 | 1 | |
| M8 0 | 0 | 0 | 0 | 0 | 0 | 1 | 0 | |

The feedback signal 32 is then shifted one bit to the left as it is given to each succeeding multiplexer. The bit 1 of the shifted feedback signal 32 coincides with the bit 1 of the signal 24 only in multiplexer 2, which corresponds to the target clock position six (see FIG. 6), which is the initial clock position two plus four minor clock periods. Similarly, if three minor clock periods from clock position seven is desired, the table would be as follows:

| Delay 0 0 | 1 0 | 2 0 | 3 1 | 4 0 | 5 0 | 6 0 | 7 0 |
|---|---|---|---|---|---|---|---|
| M1 1 | 0 | 0 | 0 | 0 | 0 | 0 | 0 |
| M2 0 | 0 | 0 | 0 | 0 | 0 | 0 | 1 |
| M3 0 | 0 | 0 | 0 | 0 | 0 | 1 | 0 |
| M4 0 | 0 | 0 | 0 | 0 | 1 | 0 | 0 |
| M5 0 | 0 | 0 | 0 | 1 | 0 | 0 | 0 |
| M6 0 | 0 | 0 | 1 | 0 | 0 | 0 | 0 |
| M7 0 | 0 | 0 | 0 | 0 | 0 | 0 | 0 |
| M8 0 | 0 | 0 | 0 | 0 | 0 | 0 | 0 |

Now the overlapping bit is in multiplexer six, which corresponds to target clock position two, which is initial clock position seven plus three minor clock periods, less eight minor clock periods in one full clock cycle.

It may thus be seen that while the duration of any state may be any multiple of ⅛T (other than 1), e.g., ¼T, ⅜T, ½T, ⅝T, etc., the feedback loop of first memory 10 and latch 12 never has to operate in a period less than ¼T, thus avoiding any delay problems unless T becomes extremely small. Similarly, memory 14 need not operate in a period less than ¼T. This also avoids the problem of building a block that operates at frequency 8/T since the fastest clock needed operates at a frequency of 2/T.

There is yet one more advantage to this arrangement. The timing memory may be used to not only set a given number of minor clock periods for each state, but to also vary that number based upon an input 25 from the user. One possibility is thus to vary the number of minor clock periods for each state depending on the speed of the clock used so that the actual duration of each state stays roughly constant regardless of which clock is used. One such scheme is shown in the chart below, where the range is stated in terms of the speed of the clock to be used in nanoseconds:

State Table for Timing Memory

| State | State Encoding | Inputs | Range (Input 25) 290 000 | 300 001 | 320 010 | 350 011 | 400 100 | 450 101 | 500 110 | 533 111 |
|---|---|---|---|---|---|---|---|---|---|---|
| 1,4 | 1 0 x 1 0 | 1 x | 7 | 7 | 6 | 5 | 4 | 3 | 2 | 2 |
| 1,4 | 1 0 x 1 0 | 0 x | 12 | 11 | 10 | 9 | 7 | 6 | 5 | 4 |
| 9 | 1 1 1 0 0 | x x | 4 | 4 | 4 | 4 | 4 | 4 | 4 | 4 |
| 10 | 1 0 1 0 0 | 1 x | 3 | 2 | 2 | 2 | 2 | 2 | 2 | 2 |
| 10 | 1 0 1 0 0 | 0 x | 8 | 6 | 6 | 6 | 4 | 4 | 4 | 2 |
| 11,17 | 1 x 0 0 1 | 1 x | 5 | 4 | 4 | 4 | 3 | 3 | 3 | 2 |
| 11,17 | 1 x 0 0 1 | 0 x | 10 | 8 | 8 | 8 | 6 | 6 | 6 | 4 |
| 12,14 | 1 x 0 1 1 | x x | 5 | 4 | 4 | 4 | 3 | 3 | 3 | 2 |
| 18 | 1 0 0 0 0 | 1 x | 11 | 11 | 10 | 9 | 8 | 7 | 6 | 6 |
| 18 | 1 0 0 0 0 | 0 x | 16 | 15 | 14 | 13 | 11 | 10 | 0 | 8 |
| 19 | 1 1 0 0 0 | 1 x | 7 | 7 | 6 | 5 | 4 | 4 | 3 | 3 |
| 19 | 1 1 0 0 0 | 0 x | 12 | 11 | 10 | 9 | 7 | 6 | 6 | 5 |
| 24 | 1 1 1 1 0 | x x | 3 | 2 | 2 | 2 | 2 | 2 | 2 | 2 |
| 26 | 1 1 0 1 0 | x x | 7 | 7 | 6 | 5 | 4 | 3 | 2 | 2 |
| 2 | 0 0 1 0 0 | x 1 | 3 | 3 | 3 | 3 | 3 | 3 | 3 | 3 |
| 0,2,3,5–8 13,15,16, 20–23,25,27 | 0 x x x x | x 0 | 2 | 2 | 2 | 2 | 2 | 2 | 2 | 2 |

The range is the unit cycle time of the clock in nanoseconds. A minor clock period is ⅛ of that time. Thus, for the 320 nanoseconds range, a minor clock period is 40 nanoseconds; for the 400 range it is 50, etc. The first input bit is from input data 8; the second is internally generated and is used to ensure that a succession of states has a total duration equal to an even number of minor clock periods, for synchronization with the surrounding environment.

In some states the duration is not very important (e.g., 9). But in most states the number of minor clock periods decreases as the clock speed slows, thus keeping the state duration approximately constant. In states 12 and 14, for example, in the 300 range, 4 minor clock periods of 37.5 nanoseconds equals 150 nanoseconds. In the 400 range, 3 such periods of 50 nanoseconds also equals 150 nanoseconds. (Not all of the numbers in this embodiment will come out exactly equal as in this example, but in the particular application a rough equivalence is sufficient.) Thus, the device could be placed in environments covering a range of clock speeds.

Another advantage is the ease with which the device may be reprogrammed for other applications and its flexibility. The first memory 10 may be reprogrammed to change the order of sequences or the response to specific inputs. The second memory 14 may be reprogrammed to change the output for any given state. Even the number of bits of input or output, or the number of states, may be changed if the memories are large enough to accommodate more bits. Finally, the timing memory may be reprogrammed to change the duration of any state or to accommodate a change in clock speed.

It is within the scope of a person skilled in the art to use, for first memory 10, second memory 14 or timing memory 22, either random access memories (RAM), read only memories (ROM), programmable read-only memories (PROM) or a programmable logic array (PLA), gate arrays, or any other similar device. As before, the number of states and bits usable and the complexity of the signals depend on the memory capacity used for each memory.

From the above description, it will be apparent that the invention disclosed herein provides a novel and advantageous apparatus for generating outputs of controlled width in a sequence determined both by preprogrammed data and inputs by the user.

The foregoing discussion discloses and describes merely exemplary methods and embodiments of the present invention. As will be understood by those familiar with the art, the invention may be embodied in other specific forms without departing from the spirit or essential characteristics thereof. Different memory devices may be used, or different outputs desired. Accordingly, the disclosure of the present invention is intended to be illustrative, but not limiting, of the scope of the invention, which is set forth in the following claims.

We claim:

1. A variable timing sequencer for producing sets of data which correspond to different current states of the sequencer, wherein the interval of each such set of data corresponds to said current state and said current state is determined by a previous state and input data, comprising
   first programmable memory means responsive to the input data and a current state signal representative of the current state for providing a a new state signal representative of a predetermined new state;
   memory latch means for receiving the new state signal, for holding the current state signal and for supplying said current state signal as an output and for replacing the current state signal with the new state signal upon receipt of a clock timing signal;
   means for supplying the current state signal to the input of the first programmable memory means;
   second programmable memory means for receiving the current state signal from said memory latch means and for producing as an output a specified set of data corresponding to the current state; and
   clock means responsive to the current state signal for generating the clock timing signal after a delay having a length determined by the current state signal, so that the first and second programmable memory means can operate at lower frequencies than the clock means.

2. The variable timing sequencer according to claim 1, wherein the clock means comprises:
   a clock having a cycle of a given unit period;
   third programmable memory means for receiving the current state signal and for producing as an output the number of clock periods for which said current state is desired to exist;
   counter means responsive to the output of the third programmable memory means for counting the number of clock periods that occur and indicating when the desired number have occurred;
   step generation means responsive to the counter means for generating the clock timing signal when the desired number of clock periods have passed.

3. The variable timing sequencer according to claim 1 wherein the clock means comprises:
   a master clock having a major cycle of a given unit period, which is divided into a plurality of minor clock periods by means of one or more phase-shifted clocks of higher frequency;
   third programmable memory means for receiving the current state signal and for producing as an output the number of minor clock periods for which said current state is desired to exist;
   means for identifying the minor clock period which exists at the time the current state commences;
   means for comparing the output of the third programmable memory means to the identified minor clock period to determine a target minor clock period corresponding to a point in time at which the desired number of minor clock periods will have occurred; and
   step generation means for generating the clock timing signal at the target minor clock period.

4. The variable timing sequencer according to claim 3 wherein the clock timing signal is generated upon detection of a rising signal edge of the appropriate phase-shifted clock.

5. The variable timing sequencer according to claim 3 wherein the step generation means further comprises qualifying means for specifying a window period during which the target minor clock period should occur so that the clock timing signal is not generated prematurely.

6. The variable timing sequencer according to claim 4 wherein the step generation means further comprises qualifying means for detecting designated states of predetermined clocks prior to the rising signal edge that indicates the target minor clock period so that the clock timing signal is not generated prematurely.

7. The variable timing sequencer according to claim 6 wherein the predetermined clocks are the master clock and the phase-shifted clock having the rising signal edge immediately preceding the rising signal edge that indicates the target minor clock period.

8. The variable timing sequencer according to claim 3 wherein the comparing means comprises means for performing modulo n addition on the output of the third programmable memory means and the identified minor clock period where n is the number of minor clock periods in a major clock cycle.

9. The variable timing sequencer according to claim 3 wherein the major cycle of the clock is divided into 8 minor clock periods and the comparing means comprises modulo 8 addition of the output of the third programmable memory means and the identified minor clock period.

10. The variable timing sequencer according to claim 8 wherein the major cycle of the clock is divided into 8 minor clock periods and the comparing means comprises modulo 8 addition of the output of the third programmable memory means and the identified minor clock period.

11. The variable timing sequencer of claim 3 wherein the number of phase-shifted clocks by which the major cycle of the clock is divided into minor clock periods is three.

12. The variable timing sequencer of claim 8 wherein the number of phase-shifted clocks by which the major cycle of the clock is divided into minor clock periods is three.

13. The variable timing sequencer of claim 9 wherein the number of phase-shifted clocks by which the major cycle of the clock is divided into minor clock periods is three.

14. The variable timing sequencer of claim 10 wherein the number of phase-shifted clocks by which the major cycle of the clock is divided into minor clock periods is three.

15. The variable timing sequencer according to claim 3 wherein the third programmable memory means contains different sets of data in different parts of the memory and receives the current state signal and also receives an input from the user which designates the portion of the memory that is to be read, such that the output, the number of minor clock periods for which said current state is desired to exist, may be varied and the speed of the device thereby adjusted.

16. The variable timing sequencer according to claim 3 wherein the sequencer executes a plurality of designated sequences, each of which has at least one state which is common to all, further comprising means for setting the total number of minor clock periods in the sequence currently being executed to an even number by setting the duration of the common state to either an odd or even number of minor clock periods depending upon whether the total number of minor clock periods of all other states of the sequence is odd or even.

17. The variable timing sequencer according to claim 3 further comprising means for delaying the generation of the clock timing signal until the second occurrence of the target minor clock period, so that states may exist for a time longer than one major clock cycle.

18. The variable timing sequencer according to claim 2 wherein the third programmable memory means receives the current state signal and also receives an input from the user which designates the portion of the memory that is to be read, such that the output, the number of clock periods for which said current state is desired to exist, may be varied and the speed of the device thereby adjusted.

19. The variable timing sequencer according to claim 1, wherein the sequencer is responsive to a clock having a cycle of a given unit period, and further wherein the clock means comprises:
 third programmable memory means for receiving the current state signal and for producing as an output the number of clock periods for which said current state is desired to exist;
 counter means responsive to the output of the third programmable memory means for counting the number of clock periods that occur and indicating when the desired number have occurred;
 step generation means responsive to the counter means for generating the clock timing signal when the desired number of clock periods have passed.

20. The variable timing sequencer according to claim 1, and where the sequencer is responsive to a master clock having a major cycle of a given unit period, which is divided into a plurality of minor clock periods by means of one or more phase-shifted clocks of higher frequency, and further wherein the clock means comprises:
 third programmable memory means for receiving the current state signal and for producing as an output the number of minor clock periods for which said current state is desired to exist;
 means for identifying the minor clock period which exists at the time the current state commences;
 means for comparing the output of the third programmable memory means to the identified minor clock period to determine a target minor clock period corresponding to a point in time at which the desired number of minor clock periods will have occurred; and
 step generation means for generating the clock timing signal at the target minor clock period.

21. The variable timing sequencer according to claim 20 wherein the clock timing signal is generated upon detection of a rising signal edge of the appropriate phase-shifted clock.

22. The variable timing sequencer according to claim 20 wherein the step generation means further comprises qualifying means for specifying a window period during which the target minor clock period should occur so that the clock timing signal is not generated prematurely.

23. The variable timing sequencer according to claim 21 wherein the step generation means further comprises qualifying means for detecting designated states of predetermined clocks prior to the rising signal edge that indicates the target minor clock period so that the clock timing signal is not generated prematurely.

24. The variable timing sequencer according to claim 23 wherein the predetermined clocks are the master clock and the phase-shifted clock having the rising signal edge immediately preceding the rising signal edge that indicates the target minor clock period.

25. The variable timing sequencer according to claim 20 wherein the comparing means comprises means for performing modulo n addition on the output of the third programmable memory means and the identified minor clock period where n is the number of minor clock periods in a major clock cycle.

26. The variable timing sequencer according to claim 20 wherein the third programmable memory means contains different sets of data in different parts of the memory and receives the current state signal and also receives an input from the user which designates the portion of the memory that is to be read, such that the output, the number of minor clock periods for which said current state is desired to exist, may be varied and the speed of the device thereby adjusted.

27. The variable timing sequencer according to claim 20 wherein the sequencer executes a plurality of designated sequences, each of which has at least one state which is common to all, further comprising means for setting the total number of minor clock periods in the sequence currently being executed to an even number by setting the duration of the common state to either an odd or even number of minor clock periods depending upon whether the total number of minor clock periods of all other states of the sequence is odd or even.

28. The variable timing sequencer according to claim 20 further comprising means for delaying the generation of the clock timing signal until the second occurrence of the target minor clock period, so that states may exist for a time longer than one major clock cycle.

29. The variable timing sequencer according to claim 19 wherein the third programmable memory means receives the current state signal and also receives an input from the user which designates the portion of the memory that is to be read, such that the output, the number of clock periods for which said current state is desired to exist, may be varied and the speed of the device thereby adjusted.

* * * * *